(No Model.)
N. M. BRINKERHOFF.
THILL COUPLING.
No. 590,127. Patented Sept. 14, 1897.
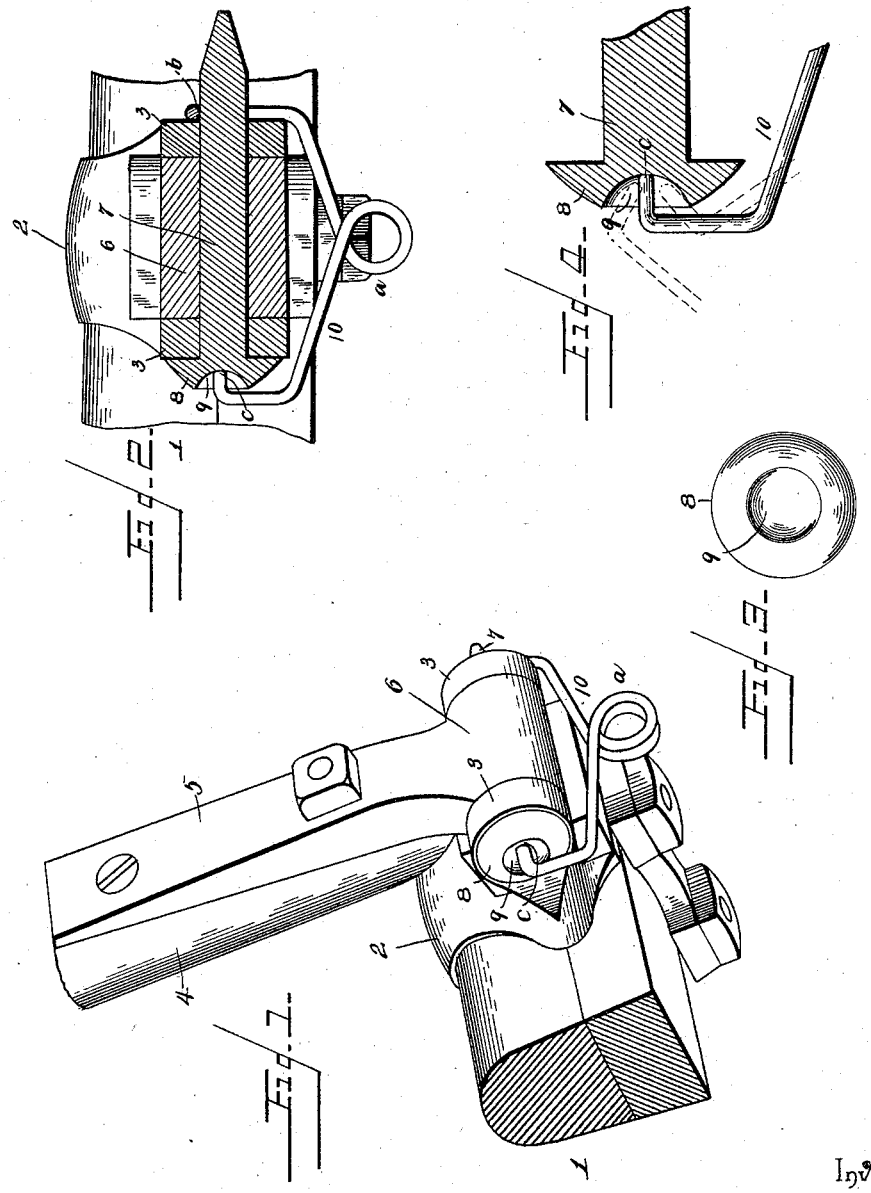
Witnesses
Thos. W. Riley
J. R. Owens
Inventor
Nelson M. Brinkerhoff
By his Attorneys.
C. A. Snow & Co.

UNITED STATES PATENT OFFICE.

NELSON M. BRINKERHOFF, OF BLOOMVILLE, OHIO.

THILL-COUPLING.

SPECIFICATION forming part of Letters Patent No. 590,127, dated September 14, 1897.

Application filed October 5, 1894. Renewed August 14, 1897. Serial No. 648,324. (No model.)

*To all whom it may concern:*

Be it known that I, NELSON M. BRINKERHOFF, a citizen of the United States, residing at Bloomville, in the county of Seneca and State of Ohio, have invented a new and useful Thill-Coupling, of which the following is a specification.

This invention relates to an improvement in that class of thill-couplings wherein a spring is provided to hold the bolt or pin in place; and it consists in a specific structural improvement over prior devices, whereby the efficiency and durability of this class of couplings is increased.

The invention is specifically related to those couplings in which a spring wire or rod is bent so as to embrace the clip and so that one end will be connected to the head of the bolt or pin and the remaining end to the point thereof.

Various means have been provided for connecting the spring to the head of the bolt or pin, and foremost among these is the arrangement of a recess in the head, into which the end of the spring is arranged. This recess is usually made of such a size that the end of the spring will be seated securely and snugly therein; and the object of my invention is to improve such a construction and to avoid the disadvantages thereof, which are principally the liability of the opening to become closed by the hammering of the bolt or pin in place and the tendency to hold the spring in a fixed position and not allow it that play which is necessary to its effective operation. This end I attain by forming the bolt or pin with a plano-convex head having centrally located in the convex side thereof a dish-shaped concavity or depression into which one end of the spring is adapted to be seated, thereby allowing said end free movement on the head of the pin or bolt and permitting the spring to swing universally within, of course, the limit of the movement allowed by the fastening at the opposite end.

In the drawings, Figure 1 represents a perspective view of a thill-coupling constructed after the manner of my invention; Fig. 2, a transverse section thereof; Fig. 3, a plan view of the head of the bolt or pin and showing the construction of the concavity therein; Fig. 4, an enlarged and detail section of the head of the bolt or pin and illustrating the concavity thereof and the operation of the spring in the same.

The reference-numeral 1 indicates the front axle of a vehicle, which may be of any kind or construction, and 2 one of the usual thill-clips thereof. These thill-clips are formed with the forwardly-projecting and oppositely-located lugs 3, which are two for each clip, as will be understood. I have shown but one of the clips 2 in the drawings, but in practice two will be used, as will be understood.

4 indicates the thill, which is used in connection with the clip shown in the drawings and which has rigidly secured thereto by the usual or any preferred means the metallic cleat 5, terminating at its inner end in an eye 6, which is of a diameter equal to the diameter of the circular portions of the lugs 3 and which is adapted to fit snugly between the same. The eye 6, as well as the lugs 3, is formed with a transverse bore or passage therein through which the pin 7 is adapted to pass and by which the thill 4 is connected to the clip 2. The pin 7 is formed of steel and has at one end the head 8, which is, as explained above, shaped as a plano-convex disk and having its convex side outward.

Formed in the convex side of the head 8 and centrally therein is the depression 9, which is dish or semipherical in shape and which is of a width equal to about the diameter of the pin 7. The remaining end of the pin is formed into a point, as may be seen by reference to the drawings, to facilitate inserting it easily into place.

10 indicates the spring, which is provided for holding the pin 7 in place and for effecting the coupling of the thill, and this may be formed of steel wire or rod, as will be understood, and is shaped to comprise a coil $a$ at its middle, an eye $b$ at one end, and a point $c$ at the remaining end. The eye $b$ is adapted to embrace the pointed end of the pin or bolt 7, and the spring extends downwardly and around the under sides of the eye 6 and lugs 3 to the head of the bolt, where the point $c$ is seated within the depression 9 thereof. The point $c$ is offset from the main portion of the spring and is located so as to occur in a line passing through the center of the eye $b$.

The operation of the spring will be readily understood. It is placed with the eye $b$ embracing the end of the pin or bolt 7 and with the point c seated in the depression 9, whereupon the resiliency of the spring will cause the eye b to be pressed against the flat outer side of the adjacent lug 3 and the point c to be firmly pressed within its depression 9. This construction allows the eye b to lie squarely against the lug adjacent thereto, and should the shape of the lug or the spring be such as to throw these parts out of alinement when first placed in position the universal mounting of the point c will permit them to assume the desired position.

It is essential that the eye b should bear squarely against its adjacent lug, since if only a portion of the eye engaged the lug said portion would be worn away and the life of the coupling very much shortened. In addition to this the appearance of the device is very much enhanced by having the parts lie closely together, all of which will be understood without further explanation.

It will be observed that the open character of the depression 9 makes it possible to drive the bolt or pin 7 in place without incurring the risk of closing said opening. This is an important function of the peculiarly-shaped opening and is one of the reasons for which said opening is provided.

Having described the invention, I claim—

A thill-coupling consisting of an axle-clip having two lugs provided with horizontally-alining perforations, a thill-eye fitting between said lugs, a bolt passing through said eye and lugs and serving to hold the eye in place, said bolt having a head in the shape of a plano-convex disk, in the convex face of which is formed a hemispheroidal recess or circular concavity, and a retaining-spring comprising a central coil and oppositely-extending upwardly-diverging arms one of which has a terminal loop embracing the shank of the bolt and bearing against one of the clip-lugs, the extremity of the other arm being bent abruptly inward and fitting within the concavity of the bolt-head, substantially as and for the purpose specified.

In testimony that I claim the foregoing as my own I have hereto affixed my signature in the presence of two witnesses.

NELSON M. BRINKERHOFF.

Witnesses:
 E. K. HUDDLE,
 M. E. BLISS.